(12) United States Patent
Gibson et al.

(10) Patent No.: US 10,340,803 B2
(45) Date of Patent: Jul. 2, 2019

(54) DC-DC CONVERTER HAVING PREDICTED ZERO INDUCTOR CURRENT

(71) Applicant: Texas Instruments Incorporated, Dallas, TX (US)

(72) Inventors: Neil Gibson, Bavaria (DE); Michael Couleur, Bavaria (DE); Antonio Priego, Bavaria (DE); Stefan Herzer, Bavaria (DE); Syed Wasif Mehdi, Bavaria (DE)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/135,987

(22) Filed: Apr. 22, 2016

(65) Prior Publication Data
US 2017/0310216 A1    Oct. 26, 2017

(51) Int. Cl.
*H02M 3/158* (2006.01)
*H02M 1/00* (2006.01)

(52) U.S. Cl.
CPC .......... *H02M 3/1588* (2013.01); *H02M 3/158* (2013.01); *H02M 2001/0009* (2013.01); *H02M 2001/0032* (2013.01); *Y02B 70/1466* (2013.01); *Y02B 70/16* (2013.01)

(58) Field of Classification Search
CPC ................. H02M 3/158; H02M 3/156; H02M 2001/009; H02M 2001/0025; H02M 3/04; H02M 3/1588; H02M 1/44
See application file for complete search history.

(56) References Cited

U.S. PATENT DOCUMENTS

| 5,663,635 | A  | * | 9/1997  | Vinciarelli | H02M 3/155 323/224 |
| 9,548,653 | B2 |   | 1/2017  | Tang et al. | |
| 2011/0316508 | A1 | * | 12/2011 | Cheng | H02M 1/14 323/282 |
| 2013/0063108 | A1 | * | 3/2013  | Nishida | H02M 3/156 323/271 |
| 2013/0241516 | A1 | * | 9/2013  | Ueno | G05F 1/618 323/285 |
| 2014/0111179 | A1 | * | 4/2014  | Couleur | H02M 3/1584 323/312 |
| 2014/0247026 | A1 | * | 9/2014  | Svorc | H02M 3/156 323/271 |
| 2014/0300326 | A1 | * | 10/2014 | Yang | H02J 7/0052 320/162 |
| 2014/0340065 | A1 | * | 11/2014 | Svorc | H02M 3/1588 323/284 |

(Continued)

*Primary Examiner* — Gustavo A Rosario-Benitez
(74) *Attorney, Agent, or Firm* — Charles A. Brill; Frank D. Cimino

(57) ABSTRACT

A DC-to-DC voltage converter includes a converter input for receiving a DC voltage. A first switch is coupled between the input and a first node. A second switch is coupled between the first node and a ground. An inductor is coupled between the first node and a converter output. A capacitor is coupled between the converter output and ground. An output voltage synthesizer is coupled to the converter input and the converter output for synthesizing the voltage at the first node and for generating a control signal for at least one of the first switch and the second switch in response to the voltages at the converter input and the converter output.

13 Claims, 3 Drawing Sheets

(56) References Cited

U.S. PATENT DOCUMENTS

| | | | | |
|---|---|---|---|---|
| 2015/0069990 A1* | 3/2015 | Feldtkeller | ............ | H02M 3/158 323/284 |
| 2016/0141957 A1* | 5/2016 | Ozawa | ................... | G01R 19/00 323/271 |

* cited by examiner

DC-DC CONVERTER HAVING PREDICTED ZERO INDUCTOR CURRENT

BACKGROUND

The ever increasing demand of integrated electronic devices in automotive, industrial, and customer platforms requires more sophisticated power conversion and distribution designs. Often these electronic devices include embedded processors, memories, and other electronic components that are operated from one battery source. DC-to-DC voltage converters are used to supply different voltages to the different electronic components. These DC-to-DC converters operate in continuous and discontinuous conduction modes depending on the output load requirements.

The DC-to-DC converters typically enter the discontinuous mode under light load conditions to improve efficiency. However, the DC-to-DC converters can have operating anomalies that degrade their efficiency when operating in the discontinuous mode.

SUMMARY

A DC-to-DC voltage converter includes a converter input for receiving a DC voltage. A first switch is coupled between the input and a first node. A second switch is coupled between the first node and a ground. An inductor is coupled between the first node and a converter output. A capacitor is coupled between the converter output and ground. An output voltage synthesizer is coupled to the converter input and the converter output for synthesizing the voltage at the converter output and for generating a control signal for at least one of the first switch and the second switch in response to the voltages at the converter input and the converter output.

DETAILED DESCRIPTION

Figure 1:
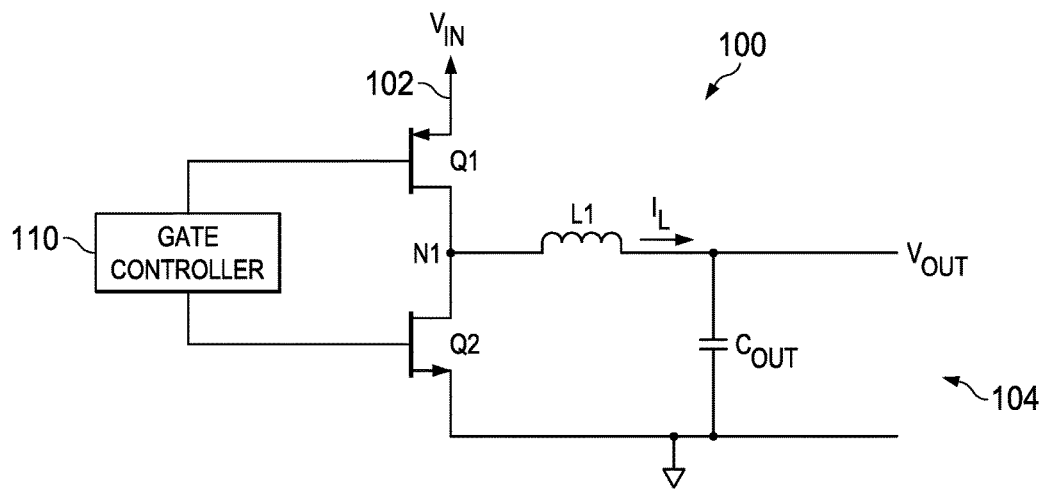
FIG. 1 is a schematic diagram of a DC-to-DC converter.

FIG. 1 is a schematic diagram of a DC-to-DC converter 100. The converter 100 includes a high-side switch, which is referred to as transistor Q1, and a low-side switch, which is referred to as transistor Q2. In the example of FIG. 1, transistor Q1 is a p-channel transistor and transistor Q2 is an n-channel transistor. The source of transistor Q1 is coupled to an input 102. During operation of the converter 100, the input 102 operates at an input voltage $V_{IN}$, which is a DC voltage that is to be converted to another DC voltage by the converter 100. The drain of transistor Q1 is coupled to a node N1. The drain of transistor Q2 is coupled to the node N1 and the source of transistor Q2 is coupled to a ground node. The ground node may operate at a potential of ground or a potential that is different than or lower than the input voltage $V_{In}$.

A first terminal of an inductor L1 is coupled to the node N1. The second terminal of the inductor L1 is coupled to a capacitor $C_{OUT}$. The junction of the inductor L1 and the capacitor $C_{OUT}$ is the output 104 or output node of the converter 100, which operates at an output voltage $V_{OUT}$. The voltage $V_{OUT}$ is the DC voltage generated by the converter 100.

The gates of transistors Q1 and Q2 are coupled to a gate controller 110 that generates gate voltages to turn the transistors Q1 and Q2 off and on. Accordingly, the gate controller 110 serves as a switch controller to control the switching function of transistors Q1 and Q2. The converter 100 receives the input voltage $V_{IN}$ at the input 102. The gate controller 110 turns transistors Q1 and Q2 off and on, so that one transistor is on while the other transistor is off. The off and on period controls the current $I_L$ flowing through the inductor L1. The current $I_L$ generates a voltage across the capacitor $C_{OUT}$, which is the output voltage $V_{OUT}$ of the converter 100. In discontinuous modes of operation, both transistor Q1 and transistor Q2 are turned off at the same time for a period.

Figure 2:
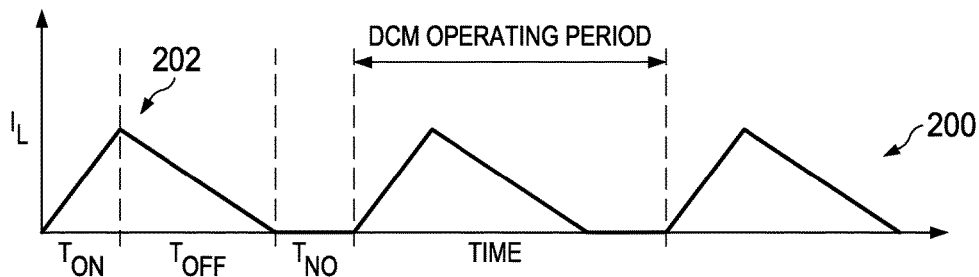
FIG. 2 is a graph showing the current through the inductor L1 of FIG. 1 as a function of the states of transistors Q1 and Q2 of FIG. 1.

FIG. 2 is a graph showing the current $I_L$ through the inductor L1 as a function of time. The waveform 200 of the current $I_L$ is substantially triangular in response to the switching of transistors Q1 and Q2. When transistor Q1 is on, transistor Q2 is off and when transistor Q1 is off, transistor Q2 is on as shown by a triangular waveform 202. Both transistors Q1 and Q2 are off during the periods between triangular waveforms, which are designated $T_{NO}$. The gate controller 110 determines the on and off time of the transistors Q1 and Q2 to obtain the correct output voltage $V_{OUT}$. During a period referred to as the on-time $T_{ON}$, transistor Q1 is on and transistor Q2 is off, so the inductor current $I_L$ increases. During a period referred to as the off-time $T_{OFF}$, transistor Q1 is off and transistor Q2 is on, so the current $I_L$ decreases. The operation of the converter 100 as shown by the waveform 200 of FIG. 2 is in a discontinuous mode (DCM) because there is period $T_{NO}$ when neither transistor Q1 nor transistor Q2 is on. The period of the waveform 200 is referred to as the DCM operating period and the inverse is the DCM operating frequency.

The DCM operation of the converter 100 maintains the efficiency of the converter 100 when very light loads are coupled to the output 104. In the DCM, the current $I_L$ in the inductor L1 should not reverse because the reversal degrades the efficiency of the converter 100. At higher loads, resistive losses are the main contributor to efficiency losses in the converter 100. At light loads where DCM is used, switching and current reversal are the main contributors of efficiency losses. Current reversal in DCM has a two-fold impact on efficiency degradation. First, current reversal degrades efficiency by discharging the capacitor $C_{OUT}$ and second, it increases the switching frequency of the transistors Q1 and Q2, which contributes to switching losses. For example, the converter 100 may use pulse frequency modulation (PFM) during DCM, so the switching frequency of the transistors Q1 and Q2 will increase if the inductor current $I_L$ reverses. Therefore, a need exists to switch off transistor Q2 when the inductor current $I_L$ reaches zero to maximize the light load efficiency during DCM operation.

Many conventional techniques have been employed to prevent the inductor current $I_L$ from reversing. Some techniques include a diode to commutate the inductor current $I_L$ during the "de-energizing phase" of the inductor L1 when the inductor current $I_L$ would otherwise reverse. The reversal of the inductor current $I_L$ does not occur because of the rectifying characteristics of the diode. When the load current, which is the output current, reduces to a point where the inductor current $I_L$ would reverse, the diode becomes high impedance and the converter 100 goes into the DCM or "pulse skipping mode" where the operating frequency of the converter 100 reduces linearly in proportion to the further reduction in load current. One of the problems with the rectifying diode is that it accounts for substantial losses when forward current flows through the diode.

In other implementations, the reversal of the inductor current $I_L$ is reduced by detecting the reversal and turning transistor Q2 off. Such converters have a fast zero crossing comparator (not shown) that detects the reversal of the inductor current $I_L$ and then turns off the transistor Q2. The technique of a zero crossing comparator does not function adequately with high frequency converters because of the comparator delay in detecting the current reversal. More specifically, the comparators are not fast enough to detect the current reversal, which results in substantial losses and inefficiencies. With the industry trends of higher current converters and higher operating frequency converters, entry into the DCM is bottlenecked by this problem of current reversal.

The circuits and methods described herein predict rather than detect the inductor current $I_L$. More specifically, the circuits and methods synthesize output voltage from on/off timers to predict zero inductor current $I_L$ by relying on the volt*second balance of an inductor. As applied to the converter 100, the on-time $T_{ON}$ is proportional to the inverse of the difference between the input voltage $V_{IN}$ and the output voltage $V_{OUT}$. The off-time $T_{OFF}$ is proportional to the inverse of the output voltage $V_{OUT}$. The synthesizers described herein synthesize the converter 100 and estimate zero inductor current $I_L$ to control the states of the transistors Q1 and Q2. The on-time $T_{ON}$ is fixed for a given $V_{IN}$, $V_{OUT}$ and the off-time $T_{OFF}$ is controllable to generate the required off-time $T_{OFF}$ in a closed loop for a given $V_{IN}$ and $V_{OUT}$. During the on-time $T_{ON}$, the synthesizers charge a capacitor with a current proportional to the difference between the input voltage $V_{IN}$ and output voltage $V_{OUT}$. During the off-time $T_{OFF}$, the synthesizers discharge the same capacitor with a current proportional to the output voltage $V_{OUT}$.

The on-time $T_{ON}$ and off-time $T_{OFF}$ are used to synthesize the output voltage $V_{OUT}$. A synthesized output voltage $V_{SYN}$ is compared with the actual output voltage $V_{OUT}$ generated by the converter 100 and the differences between the two voltages $V_{SYN}$ and $V_{OUT}$ are balanced out or equalized in a control loop by adjusting the off-time $T_{OFF}$, which controls the off-time $T_{OFF}$ of transistor Q2. Similar methods may be applied to other converter topologies, such as boost converters, constant on-time converters, and constant off-time converters.

Figure 3:
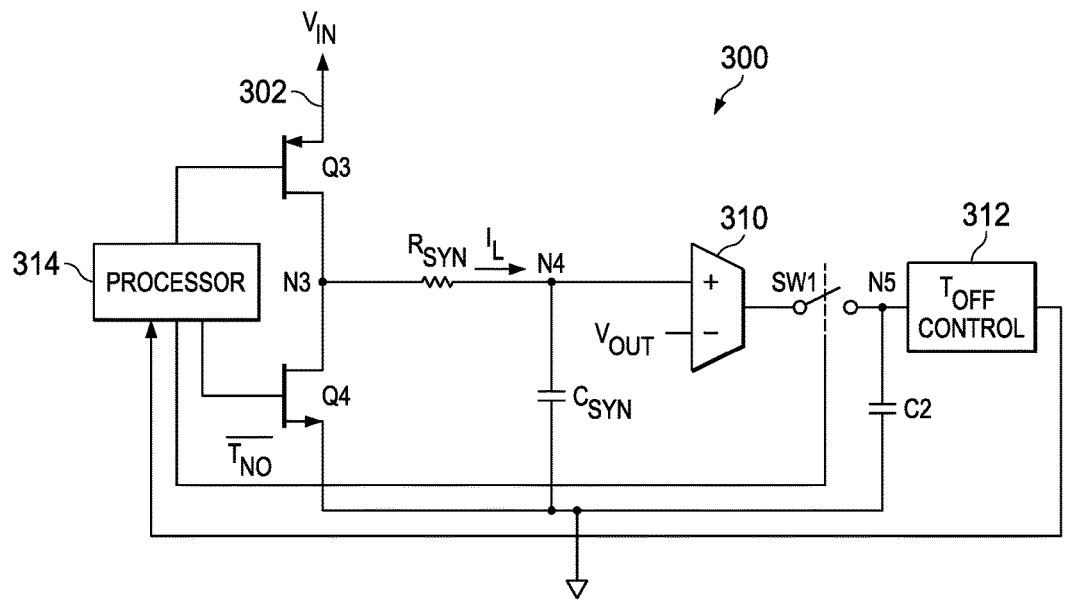
FIG. 3 is a schematic diagram of an example output voltage synthesizer of a DC-to-DC converter.

FIG. 3 is a schematic diagram of an example of an output voltage synthesizer 300 that employs the voltage conversion techniques described above. The synthesizer 300 includes a transistor Q3 and a transistor Q4, which are identical or substantially similar sized replicas of transistors Q1 and Q2, respectively, of FIG. 1. Transistors Q3 and Q4 function as switches and may be substituted by other switching components. The source of transistor Q3 is coupled between an input 302 and a node N3. The input 302 is coupled to a node or the like that is coupled to the input voltage $V_{IN}$ of FIG. 1. Accordingly, the source of transistor Q3 is at the $V_{IN}$ voltage potential. The drain of transistor Q4 is coupled to the node N3 and the source of transistor Q4 is coupled to ground. The ground is a potential that is different than the operating potential of the input voltage $V_{IN}$ and may be the same potential that the source of transistor Q2 is coupled to.

A resistor $R_{SYN}$ is coupled between the node N3 and a node N4. The resistor $R_{SYN}$ synthesizes the current drawn through the converter 100 of FIG. 1 as described below. A capacitor $C_{SYN}$ is coupled between the node N4 and ground. The voltage potential at the node N4 is the synthesized output voltage $V_{SYN}$. An integrating transconductance stage 310 has a first input coupled to the node N4 and a second input coupled to the output 104 of the converter 100. Accordingly, the second input is at the potential of the output voltage $V_{OUT}$ of the converter 100. The output of the transconductance stage 310 is coupled to a switch SW1, wherein the switch SW1 is open during the $T_{NO}$ periods of FIG. 2. The output of the transconductance stage 310 is described herein as being a voltage; however, the transconductance stage 310 may generate signals other than voltages. The other side of the switch SW1 is coupled to a node N5. A capacitor C2 and a $T_{OFF}$ controller 312 are both coupled to the node N5. A processor 314 is coupled to the gates of transistors Q3 and Q4 and controls the state of the switch SW1.

The value of $R_{SYN}$ is selected so that the current flow through resistor $R_{SYN}$ has the same form as the inductor current $I_L$ of FIG. 1. The resistor $R_{SYN}$ and the capacitor $C_{SYN}$ form a low pass filter for the input waveform generated at the node N3. The selection of the time constant of the low pass filter of $R_{SYN}$ and $C_{SYN}$ provides a trade-off between speed and accuracy of the volt-sec balance regulation loop. If the time constant is small, the regulation loop settles faster but will have more inaccuracy. If the time constant is long, the regulation loop will take longer to settle, but will have fewer inaccuracies. In some examples, the time constant is selected to be 1/10 of the switching frequency of the transistors Q3 and Q4 to achieve a balance between accuracy and settling speed of the regulation loop.

Charging and discharging currents that synthesize the inductor current $I_L$ of FIG. 1 are developed as voltages across the resistor $R_{SYN}$. In this case the charging current is proportional to the difference between the input voltage $V_{IN}$ and the output voltage $V_{SYN}$ at node N4. The discharging current is proportional to the synthesized output voltage $V_{SYN}$ at node N4. The voltage $V_{SYN}$ is filtered by the low pass filter of the resistor $R_{SYN}$ and the capacitor $C_{SYN}$, which replicates the output of a buck converter, such as the converter 100 of FIG. 1. The synthesized output voltage $V_{SYN}$ is compared to the actual output voltage $V_{OUT}$ of the converter 100 by the transconductance stage 310. The switch SW1 closes to charge the capacitor C2 to the voltage output by the transconductance stage 310 and opens to hold the voltage for input to the $T_{OFF}$ controller 312.

The $T_{OFF}$ controller 312 generates a signal that controls the off-time $T_{OFF}$ in both the converter 100 and the synthesizer 300. For example, the signal generated by the $T_{OFF}$ controller 312 is processed by the processor 314 and the gate controller 110 to set the off-time $T_{OFF}$. As can be seen in FIG. 3, the signal generated by the $T_{OFF}$ controller 312 closes a feedback loop in the synthesizer 300. In summary, the on-time $T_{ON}$ is always controlled by the processor 314. The off-time $T_{OFF}$ is regulated and controlled by the $T_{OFF}$ controller 312 in DCM and is controlled by the processor 314 in CCM. In CCM, the converter 100 has much higher losses, such as power stage losses, so the actual off-time $T_{OFF}$ is smaller than the theoretical off-time $T_{OFF}$. Therefore, the processor 314 overwrites the $T_{OFF}$ controller 312 in CCM.

Figure 4A:
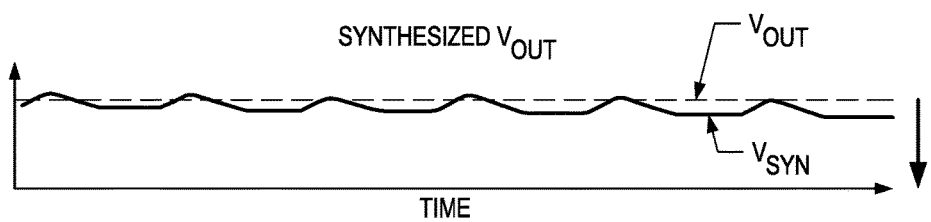
FIG. 4A is a graph of a synthesized output voltage from the output voltage synthesizer of FIG. 3 and the output voltage from the DC-to-DC converter of FIG. 1.
Figure 4B:
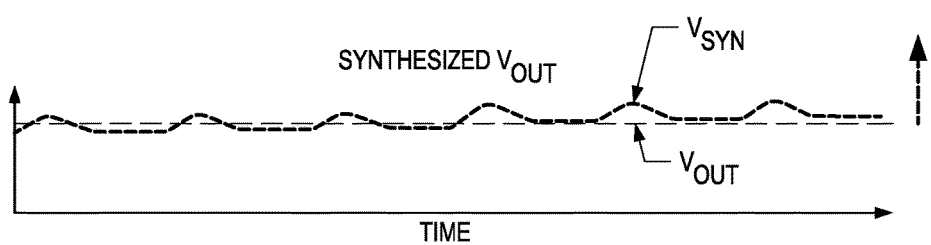
FIG. 4B is a graph of a synthesized output voltage from the output voltage synthesizer of FIG. 3 and the output voltage from the DC-to-DC converter of FIG. 1.

FIGS. 4A and 4B are graphs of examples of the synthesized output voltage $V_{SYN}$ generated by the synthesizer 300 of FIG. 3 and the output voltage $V_{OUT}$ generated by the converter 100 of FIG. 1. If the off-time $T_{OFF}$ of FIG. 2 is too long, then the synthesized output voltage $V_{SNY}$ will be lower than the actual output voltage $V_{OUT}$ as shown in FIG. 4A. A correction voltage generated by the transconductance stage 310 goes low to reduce the off-time $T_{OFF}$. If the off-time $T_{OFF}$ is too short, then the synthesized output voltage $V_{SYN}$ will be higher than the actual output voltage $V_{OUT}$ as shown in FIG. 4B. The output of the transconductance stage 310 increases to increase the off-time $T_{OFF}$. In steady state, the off-time $T_{OFF}$ will settle down to the required off-time $T_{OFF}$.

The synthesizer 300 places an extra pole in the control loop of the converter 100. The control loop includes the transconductance stage 310 and the gate controller 110. The synthesizer 300 is simple to implement, so the pole may be worked around or avoided during operation of the synthesizer 300. Because the resistor $R_{SYN}$ is being effectively switched at the DCM operating frequency, the pole introduced varies in direct proportion to the operating frequency. It is akin to a switched resistor filter. Thus, a compensation pole associated with the transconductance of the transconductance stage 310 and the capacitor C2 also needs to vary in frequency proportional to the DCM operating frequency.

Figure 5:
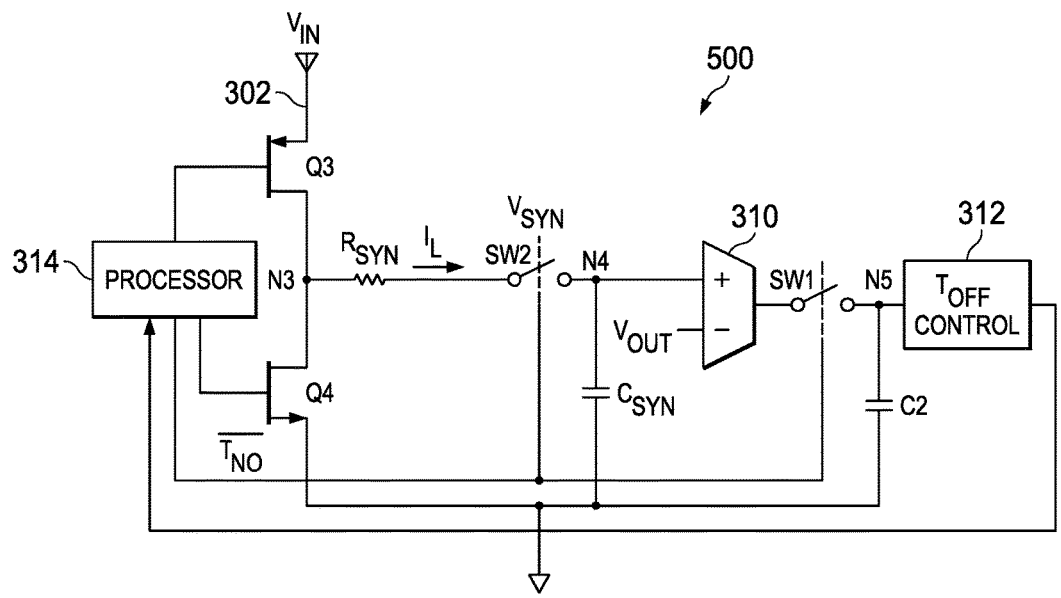
FIG. 5 is a schematic diagram of another example of an output voltage synthesizer.

FIG. 5 is another example of an output voltage synthesizer 500 that overcomes the above-described pole problem. The synthesizer 500 is identical or similar to the synthesizer 300 of FIG. 3 except for the addition of a switch SW2 and the location of the capacitor C2. In the example of FIG. 5, the state of the switches SW1 and SW2 are controlled by the processor 314. The above-described problems are overcome by commutating the output of the transconductance stage 310 into the capacitor C2 during the generation time of the synthesized output voltage $V_{SYN}$. The voltage $V_{SYN}$ is held by the capacitor C2 during this time. Therefore, the non-dominant pole and its compensating dominant pole track one another, ensuring a constant phase margin over a wide DCM operating frequency range.

Figure 6:
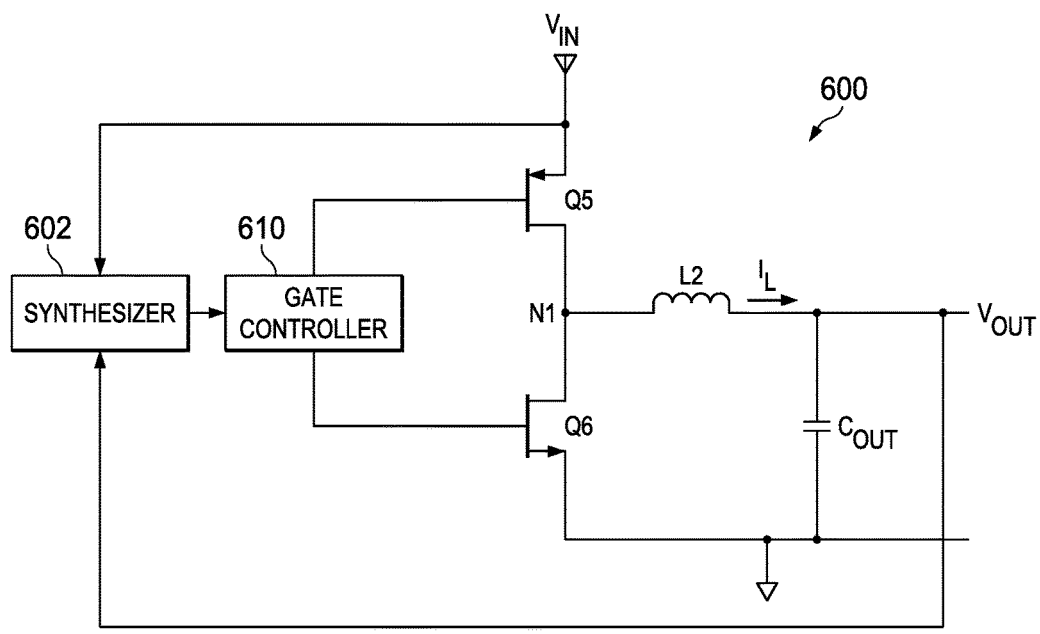
FIG. 6 is a block diagram of a DC-to-DC converter having an output voltage synthesizer included therein.

FIG. 6 is a block diagram of a DC-to-DC converter 600 that includes a voltage synthesizer 602. The converter 600 is substantially similar to the converter 100 of FIG. 1 with the addition of the synthesizer 602. The voltage synthesizer 602 may be any of the synthesizers described above. A gate controller 610 controls the on-times and off-times of two transistors Q5 and Q6 much in the same manner that the gate controller 110 of FIG. 1 controls the on-times and off-times of transistors Q1 and Q2. The on-times and off-times of the transistors Q5 and Q6 determine the current flow $I_L$ through an inductor L2 and an output capacitor $C_{OUT}$.

The input voltage $V_{IN}$ and the output voltage $V_{OUT}$ are coupled to the synthesizer 602 as shown in FIGS. 3, 5, and 6. The voltages $V_{IN}$ and $V_{OUT}$ are input to the synthesizer 602 to generate the $T_{OFF}$ signals, which are output to the gate controller 610 to control the on-time $T_{ON}$ and/or the off-time $T_{OFF}$. The synthesizer 602 prevents or reduces the likelihood that the current $I_L$ reverses through the inductor L2, which improves the efficiency of the converter 600. In some examples, the synthesizer 602 and the gate controller 610 are a single processor.

Figure 7:
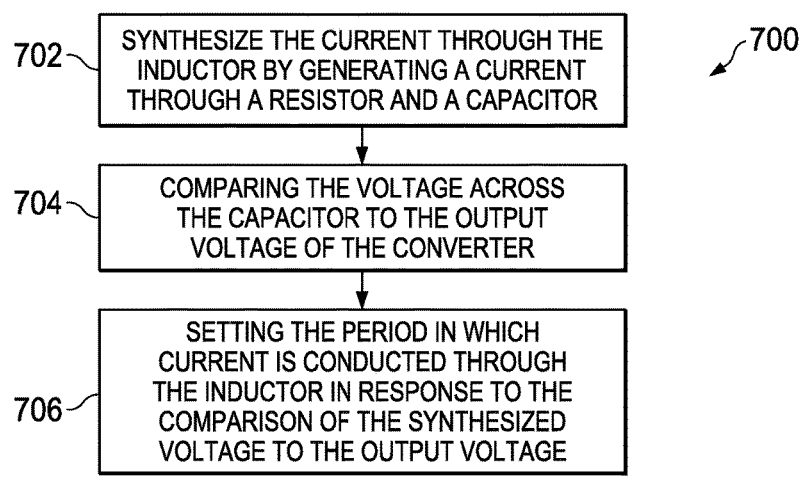
FIG. 7 is a flowchart describing a method for operating a DC-to-DC converter.

FIG. 7 is a flowchart 700 describing a method for operating a DC-to-DC converter based on the synthesizers described herein. In step 702 the current through an inductor is synthesized by generating a current through a resistor and a capacitor. In step 704 the voltage across the capacitor is compared to the output voltage of the converter. In step 706 the period in which current is conducted through the inductor is set in response to the comparison of the synthesized voltage to the output voltage.

While some examples of output voltage synthesizers and methods for synthesizing output voltages have been described in detail herein, it is to be understood that the inventive concepts may be otherwise variously embodied and employed and that the appended claims are intended to be construed to include such variations except insofar as limited by the prior art.

What is claimed is:

1. A DC-to-DC voltage converter comprising:
   a converter input for receiving a DC voltage;
   a first switch coupled between the input and a first node;
   a second switch coupled between the first node and a ground;
   an inductor coupled between the first node and a converter output;
   a capacitor coupled between the converter output and the ground;
   an output voltage synthesizer coupled to the converter input and the converter output for synthesizing the voltage at the converter output and for generating a control signal for at least one of the first switch and the second switch in response to the synthesized voltage at the converter and to predict zero inductor current using volt*second balance of the inductor;
   the synthesizer comprising:
      a synthesizer input coupled to the converter input;
      a third switch coupled between the synthesizer input and a second node;
      a fourth switch coupled between the second node and the ground;
      a resistor coupled between the second node and a third node;
      the capacitor coupled between the third node and the ground;
      an integrating transconductance stage for comparing the voltage at a first input to the voltage at a second input and generating an output signal in response to the comparison, wherein the first input is coupled to the third node and the second input is coupled to the converter output;
      at least one of the first switch, the second switch, the third switch, and the fourth switch being controlled in response to the output signal of the integrating transconductance stage;
      further comprising a fifth switch coupled to the output of the integrating transconductance stage, the fifth switch coupling the output of the integrating transconductance stage to the capacitor for sampling and holding the output signal of the integrating transconductance stage.

2. The converter of claim 1, wherein the period in which the second and fourth switches are on is set in response to the output signal of the integrating transconductance stage.

3. The converter of claim 1, wherein the period that the second and fourth switches are on is increased in response to the output signal of the transconductance stage indicating that the voltage of the third node is greater than the voltage of the converter output.

4. The converter of claim 1, wherein the period that the second and fourth switches are on is reduced in response to the output signal of the transconductance stage indicating that the voltage of the third node is less than the voltage of the converter output.

5. The converter of claim 1, wherein the fifth switch is opened when the third and fourth switches are off.

6. The converter of claim 1 further comprising a sixth switch coupled between the resistor and the third node, wherein the sixth switch is timed to operate with the fifth switch.

7. The converter of claim 1, comprising increasing the period that the inductor discharges in response to the comparing indicating that the synthesized voltage is greater than the output voltage of the converter.

8. The converter of claim 1, comprising decreasing the period that the inductor discharges in response to the comparing indicating that the synthesized voltage is less than the output voltage of the converter.

9. A synthesizer for at least partially regulating a DC-to-DC converter, the synthesizer comprising:
   a synthesizer input coupled to an input of the DC-to-DC converter;
   a first switch coupled between the synthesizer input and a first node;
   a second switch coupled between the first node and a ground;
   a resistor coupled between the first node and a second node;
   the second node being coupleable to a capacitor, which is also coupleable to the ground;
   an integrating transconductance stage for comparing the voltage output of the converter to the synthesized voltage and generating an output signal in response to the comparison for predicting zero inductor current using volt*second balance of an inductor without requiring a backflow detector;
   at least one of the first switch and the second switch being controlled in response to the output signal of the integrating transconductance stage.

10. The synthesizer of claim 8, wherein the period in which the second switch is on is set in response to the output signal of the integrating transconductance stage.

11. The synthesizer of claim 8, wherein the period that the second switch is on is increased in response to the output signal of the transconductance stage indicating that the voltage of second node is greater than the voltage of the converter output.

12. The synthesizer of claim 8, wherein the period that the second switch is on is reduced in response to the output signal of the transconductance stage indicating that the voltage of the second node is less than the voltage of the converter output.

13. A synthesizer for at least partially regulating a DC-to-DC converter, the synthesizer comprising:
   a synthesizer input coupled to an input of the DC-to-DC converter;
   a first switch coupled between the synthesizer input and a first node;
   a second switch coupled between the first node and a ground;
   a resistor coupled between the first node and a second node;
   a capacitor coupled between the second node and the ground;
   an integrating transconductance stage for comparing the voltage output of the converter to the synthesized voltage and generating an output signal in response to the comparison;
   wherein at least one of the first switch and the second switch are controlled in response to the output signal of the integrating transconducting stage;
   further comprising a third switch coupled to the output of the transconductance stage, the third switch coupling the output of the transconductance stage to the capacitor for sampling and holding the output signal of the transconductance stage.

* * * * *